United States Patent
Han et al.

(10) Patent No.: US 12,452,507 B2
(45) Date of Patent: Oct. 21, 2025

(54) CAMERA MODULE

(71) Applicant: LG INNOTEK CO., LTD., Seoul (KR)

(72) Inventors: Sang Yeal Han, Seoul (KR); Je Kyung Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 72 days.

(21) Appl. No.: 18/580,502

(22) PCT Filed: Jul. 18, 2022

(86) PCT No.: PCT/KR2022/010474
§ 371 (c)(1),
(2) Date: Jan. 18, 2024

(87) PCT Pub. No.: WO2023/003308
PCT Pub. Date: Jan. 26, 2023

(65) Prior Publication Data
US 2024/0323500 A1    Sep. 26, 2024

(30) Foreign Application Priority Data

Jul. 21, 2021   (KR) .................. 10-2021-0096066

(51) Int. Cl.
*H04N 23/51*   (2023.01)
*H04N 23/54*   (2023.01)
*H04N 23/57*   (2023.01)

(52) U.S. Cl.
CPC ............ *H04N 23/51* (2023.01); *H04N 23/54* (2023.01); *H04N 23/57* (2023.01)

(58) Field of Classification Search
CPC ........ G03B 17/02; G03B 17/08; H04N 23/51; H04N 23/54; H04N 23/55; H04N 23/57
See application file for complete search history.

(56) References Cited

U.S. PATENT DOCUMENTS

| 6,518,864 B1 | 2/2003 | Ito et al. |
| 2014/0132768 A1 | 5/2014 | Choi et al. |

(Continued)

FOREIGN PATENT DOCUMENTS

| EP | 2 136 552 A1 | 12/2009 |
| EP | 3 346 692 A1 | 7/2018 |

(Continued)

OTHER PUBLICATIONS

International Search Report dated Oct. 20, 2022 in International Application No. PCT/KR2022/010474.

(Continued)

*Primary Examiner* — Amy R Hsu
(74) *Attorney, Agent, or Firm* — Saliwanchik, Lloyd & Eisenschenk

(57) ABSTRACT

This camera module comprises: a first body including a lens; a second body coupled to the first body; and a printed circuit board which is disposed in a space inside the first body and the second body and includes an image sensor. The first body includes: a first protrusion protruding downward from the lower surface; and a first coupling groove located inside the first protrusion. The second body includes: a second protrusion protruding upward from the upper surface and facing the first coupling groove; and a second coupling groove located outside the second protrusion and facing the first protrusion. Adhesive members are arranged on the inner surface, the upper surface, and the outer surface of the second protrusion, and the second protrusion has one or more grooves or holes for arranging the adhesive members.

20 Claims, 6 Drawing Sheets

(56) References Cited

U.S. PATENT DOCUMENTS

| | | | |
|---|---|---|---|
| 2015/0015778 A1 | 1/2015 | Lee | |
| 2018/0217348 A1* | 8/2018 | Han | G02B 7/02 |
| 2019/0028620 A1 | 1/2019 | Park | |
| 2019/0373142 A1 | 12/2019 | Fujiwara et al. | |
| 2020/0053258 A1 | 2/2020 | Park et al. | |
| 2020/0292918 A1 | 9/2020 | Park | |
| 2021/0109422 A1* | 4/2021 | Chen | G03B 17/08 |
| 2022/0190015 A1* | 6/2022 | Baik | H04N 25/00 |
| 2022/0407989 A1* | 12/2022 | Lee | H04N 23/57 |
| 2023/0176320 A1* | 6/2023 | Park | G03B 13/36 |
| | | | 359/824 |

FOREIGN PATENT DOCUMENTS

| | | |
|---|---|---|
| JP | 2008-35215 A | 2/2008 |
| JP | 2018-98660 A | 6/2018 |
| KR | 10-2018-0118459 A | 10/2018 |
| KR | 10-2019-0004457 A | 1/2019 |
| KR | 10-2019-0063028 A | 6/2019 |
| KR | 10-2020-0108155 A | 9/2020 |
| KR | 10-2021-0057414 A | 5/2021 |

OTHER PUBLICATIONS

Supplementary European Search Report dated Apr. 28, 2025 in European Application No. 22846178.6.

* cited by examiner

CAMERA MODULE

CROSS-REFERENCE TO RELATED APPLICATIONS

This application is the U.S. national stage application of International Patent Application No. PCT/KR2022/010474, filed Jul. 18, 2022, which claims the benefit under 35 U.S.C. § 119 of Korean Application No. 10-2021-0096066, filed Jul. 21, 2021, the disclosures of each of which are incorporated herein by reference in their entirety.

TECHNICAL FIELD

The present embodiment relates to a camera module.

BACKGROUND ART

Recently, a subminiature camera module has been developed, and the miniature camera module is widely used in small electronic products such as smart phones, laptop computers, and game consoles.

As the spread of automobiles has become popular, subminiature cameras are widely used not only in small electronic products but also in vehicles. For example, black box cameras for vehicle protection or objective data on traffic accidents, rear surveillance cameras enabling the driver to monitor blind spots at the rear of the vehicle through a screen to ensure safety when reversing the vehicle, ambient detection cameras capable of monitoring the surroundings of the vehicle, and the like are provided.

A camera may be provided with a lens, a lens holder for accommodating the lens, an image sensor for converting an image of a subject collected in the lens into an electrical signal, and a printed circuit board on which the image sensor is mounted. The housing that forms the external shape of the camera has an entirely sealed structure to inhibit internal components from being contaminated by foreign substances containing moisture.

DETAILED DESCRIPTION OF THE INVENTION

Technical Subject

The present embodiment is intended to provide a camera module that can firmly maintain a coupled state between pluralities of bodies by improving the structure. Therefore, the internal components can be inhibited from being contaminated by external foreign substances through a simple coupling structure.

Technical Solution

A camera module according to the present embodiment comprises: a first body including a lens; a second body being coupled to the first body; and a printed circuit board being disposed in a space inside the first body and the second body and including an image sensor, wherein the first body includes a first protrusion being protruded downward from a lower surface and a first coupling groove being disposed inside the first protrusion, wherein the second body includes a second protrusion being protruded upward from an upper surface and facing the first coupling groove and a second coupling groove being disposed outside the second protrusion and facing the first protrusion, wherein adhesive members are disposed on an inner surface, an upper surface, and an outer surface of the second protrusion, and wherein the second protrusion has at least one or more grooves or holes so that the adhesive members are disposed thereto.

The second protrusion may include a hole penetrating from an inner surface to an outer surface.

The holes may be provided in plural numbers and may be disposed to be spaced apart from one another along the circumference of the second protrusion.

The length of the hole in an optical axis direction may be less than ½ of the length of the second protrusion in an optical axis direction.

A first groove may be disposed on an inner surface of the second protrusion, and a second groove may be disposed on an outer surface of the second protrusion.

The length from the outer surface of the second protrusion to the bottom surface of the second groove or the length from the inner surface of the second protrusion to the bottom surface of the first groove may be within 30% of the thickness of the second protrusion.

A groove having a shape being recessed more downward than other areas is disposed on an upper surface of the second protrusion, and the groove may be provided in plural numbers and disposed to be spaced apart from one another along the circumference of the second protrusion.

A groove being recessed more outward than other areas may be disposed on an inner surface of the second protrusion, and each of the grooves may be respectively disposed on an inner surface of the second protrusion forming four sides of the second body.

The groove may be a long groove being extended in a lengthwise direction of the side.

The adhesive member may include epoxy.

Advantageous Effects

Through the present embodiment, a groove or hole is formed on the surface of the second protrusion where the adhesive member is disposed, thereby increasing the placement area of the adhesive member, and thus there is an advantage in that the coupled state of the first body and the second body can be maintained more firmly.

BEST MODE

Hereinafter, preferred embodiments of the present invention will be described in detail with reference to the accompanying drawings.

However, the technical idea of the present invention is not limited to some embodiments to be described, but may be implemented in various forms, and inside the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

The 'optical axis direction' used below is defined as the optical axis direction of the lens. Meanwhile, 'optical axis direction' may correspond to such as 'up and down direction', 'z-axis direction', and the like.

Hereinafter, the present invention will be described in more detail with reference to the attached drawings.

Figure 1:
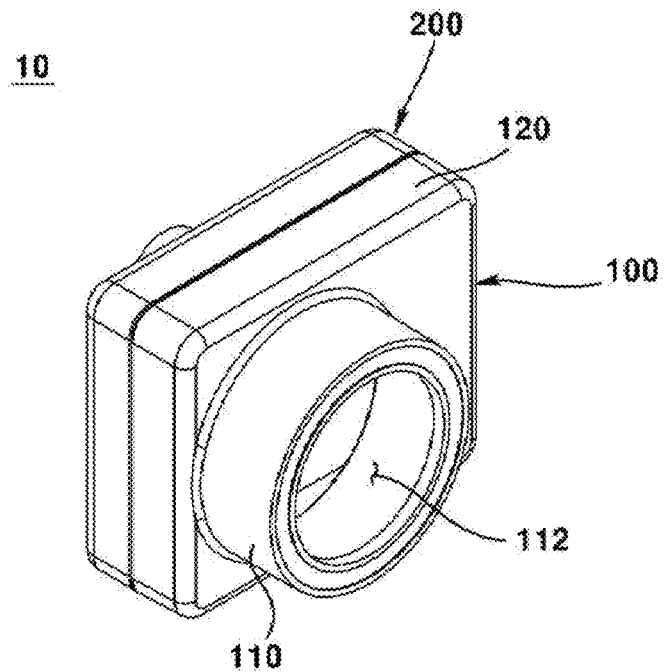
FIG. 1 is a perspective view illustrating the external appearance of a camera module according to an embodiment of the present invention.
Figure 2:
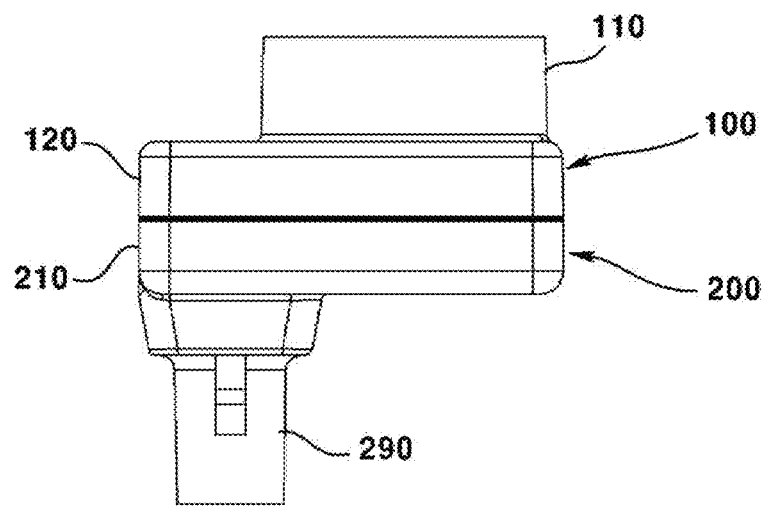
FIG. 2 is a cross-sectional view of a camera module according to an embodiment of the present invention.
Figure 3:
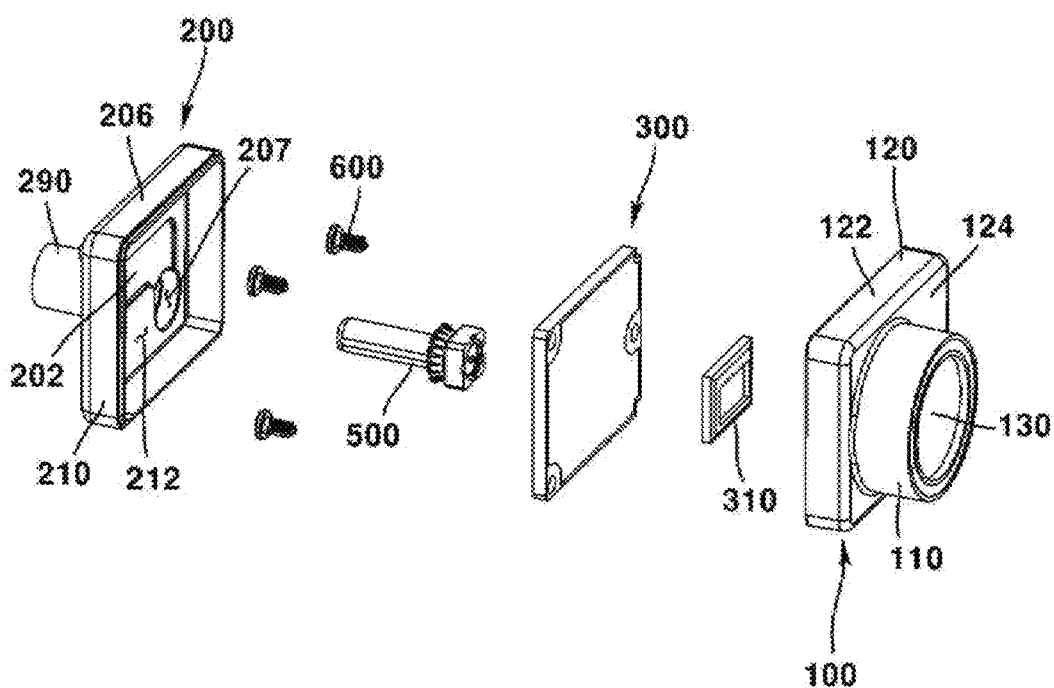
FIG. 3 is an exploded perspective view of a camera module according to an embodiment of the present invention.
Figure 4:
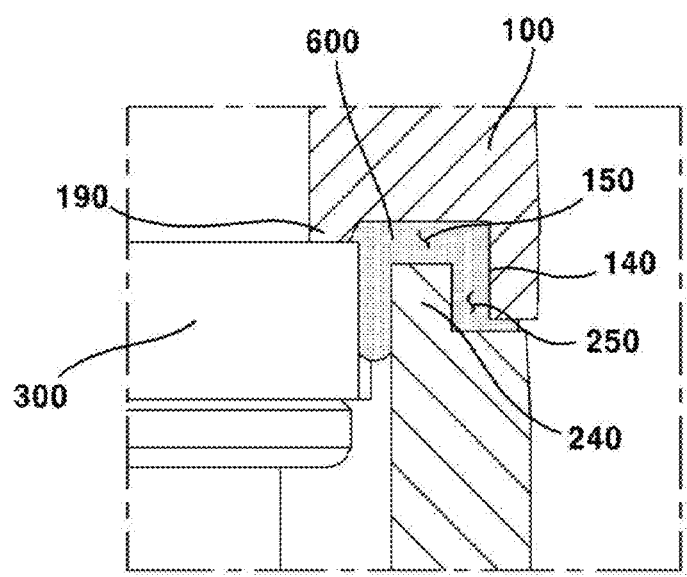
FIG. 4 is a cross-sectional view illustrating a coupling structure of a first body and a second body according to an embodiment of the present invention.
Figure 5:
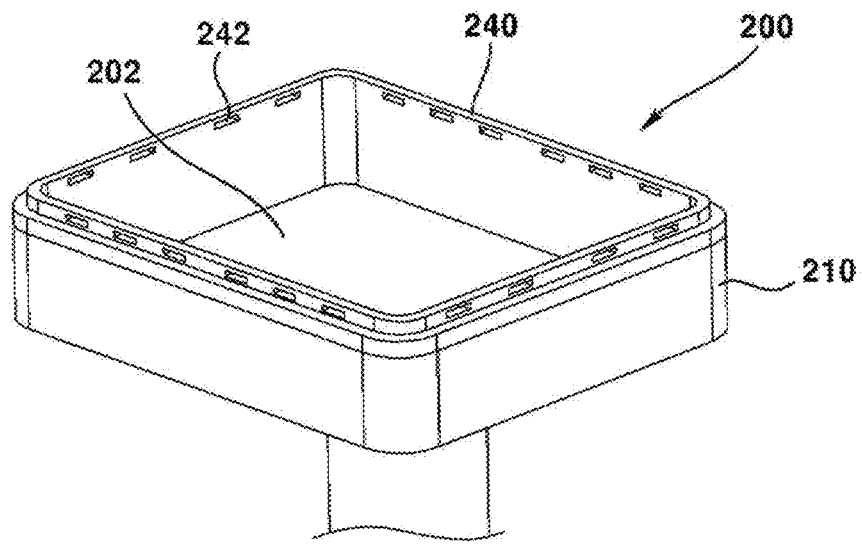
FIG. 5 is a perspective view of a second body according to a first embodiment of the present invention.
Figure 6:
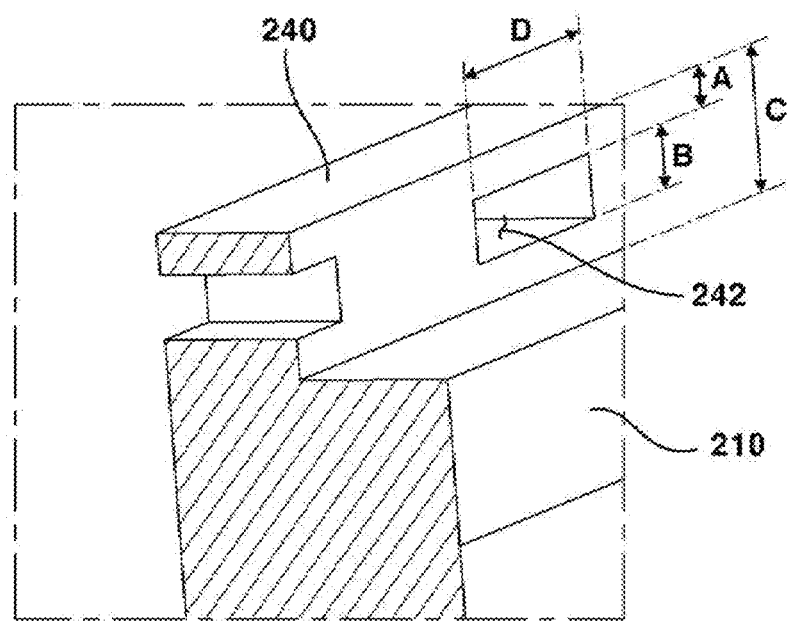
FIG. 6 is a perspective view illustrating a portion of the second protrusion cut away according to a first embodiment of the present invention.

FIG. 1 is a perspective view illustrating the external appearance of a camera module according to an embodiment of the present invention; FIG. 2 is a cross-sectional view of a camera module according to an embodiment of the present invention; FIG. 3 is an exploded perspective view of a camera module according to an embodiment of the present invention; FIG. 4 is a cross-sectional view illustrating a coupling structure of a first body and a second body according to an embodiment of the present invention; FIG. 5 is a perspective view of a second body according to a first embodiment of the present invention; and FIG. 6 is a perspective view illustrating a portion of the second protrusion cut away according to a first embodiment of the present invention.

Referring to FIGS. 1 to 6, a camera module 10 according to an embodiment of the present invention may be a vehicle camera module. The camera module 10 may be coupled to a vehicle. The camera module 10 may be used in one or more among a front camera, side camera, rear camera, and black box of a vehicle. The camera module 10 may be disposed in the front of the vehicle. The camera module 10 may be disposed at the rear of the vehicle. The camera module 10 may be coupled to the windshield of a vehicle. The camera module 10 may be coupled to the windshield at the front or rear of the vehicle. The camera module 10 may be disposed on a side of the vehicle. The camera module 10 can photograph a subject and output it as an image on a display (not shown).

The camera module 10 may include a first body 100. The first body 100 may be referred to as one among a front body, an upper housing, and a first housing. The first body 100 may include a body portion 120. The first body 100 may include a barrel portion 110. The first body 100 may include a lens 130. The body portion 120, the barrel portion 110, and the lens 130 of the first body 100 may be formed integrally. Any two or more of the body portion 120, the barrel portion 110, and the lens 130 of the first body 100 may be formed integrally. As a modified embodiment, the body portion 120, the barrel portion 110, and the lens 130 may be formed separately.

The body portion 120 may be coupled to the barrel portion 110. The body portion 120 may be formed integrally with the barrel portion 110. The body portion 120 may be formed of a metal material. The body portion 120 may be disposed above the second body 200, which will be described later. The body portion 120 may be coupled to the second body 200. The lower end of the body portion 120 may be fixed to the second body 200. The body portion 120 may be coupled to the second body 200 with an adhesive. The body portion 120 may be coupled with a printed circuit board 300, which will be described later.

The body portion 120 may be formed in a rectangular shape with an open lower portion. At this time, the corners of the body portion 120 may be formed to be rounded. The body portion 120 may include an upper plate 124 and a first side plate 122 being extended from the upper plate 124. The upper plate 124 may be formed in a rectangular shape. The upper plate 124 may be extended outward from the outer circumferential surface at the lower end of the barrel portion 110. The first side plate 122 may be extended downward from the outer edge of the upper plate 124. The first side plate 122 may be provided in plural numbers. The first side plate 122 may include four side plates. The first side plate 122 may be formed in a rectangular plate shape. The first side plate 122 may comprise: a first-first side plate and a first-second side plate; a first-third side plate being disposed at an opposite side of the first-first side plate; and a first-fourth side plate being disposed on an opposite side of the first-second side plate. The first side plate 122 may include first-first to first-fourth corners being respectively disposed between the first-first to first-fourth side plates. Each of the first-first to first-fourth corners may include a round shape at least in part.

A space portion being partitioned from other areas may be formed inside the body portion 120. The lower portion of the space portion may be open, and the upper portion may be covered through the barrel part 110 and the lower surface of the lens 130.

The body portion 120 may include a first edge area. The first edge area may be disposed outside the space portion. The first edge area may form a lower edge of the body portion. The first edge area may be formed on a lower surface of the first side plate 122.

The first edge area may include a first protrusion 140 and a first coupling groove 150. With respect to the center of the body portion 120, the first coupling groove 150 may be disposed inside the first protrusion 140.

The first protrusion 140 may be disposed outside the first coupling groove 150. The first protrusion 140 may be formed to be protruded downward from the lower surface of the body portion 120. The first protrusion 140 may be protruded more downward from the lower surface of the first side plate 122 than other areas. With respect to the optical axis direction, the lower end of the first protrusion 140 may be disposed at an upper portion of the lower surface of the printed circuit board 300. With respect to the optical axis direction, the lower end of the first protrusion 140 may be disposed lower than the upper surface of the printed circuit board 300. The lower end of the first protrusion 140 may be disposed lower than the bottom surface of the first coupling groove 150. The bottom surface of the first coupling groove 150 may be disposed at an upper side higher than the upper surface of the printed circuit board 300.

The first coupling groove 150 may be disposed inside the first protrusion 140. The first coupling groove 150 may be formed to be recessed more upward than the lower end of the first protrusion 140. The bottom surface of the first coupling groove 150 may be disposed more above than the lower end of the first protrusion 140. The bottom surface of the first coupling groove 150 may be defined as a lower surface of the first side plate 122. The first coupling groove 150 may be an area being formed by the first protrusion 140 being protruded from the first side plate 122.

A guide 190 being protruded more downward than other areas and disposed on an upper surface of the printed circuit board 300 may be disposed inside the first coupling groove 150. The lower surface of the guide 190 may be in contact with the upper surface of the printed circuit board 300. The first coupling groove 150 may be an area being disposed between the first protrusion 140 and the guide 190.

The first body 100 may include a barrel portion 110. The barrel portion 110 may be a lens barrel. The barrel portion 110 may be formed of a metal material. The barrel portion 110 may be disposed in the body portion 120. The barrel portion 110 may be extended from the upper surface of the body portion 120. The barrel portion 110 may be formed integrally with the body portion 120. As a modified embodiment, the barrel portion 110 may be coupled to the body portion 120. In this case, the barrel portion 110 may be fixed to the body portion 120 by an adhesive. The barrel portion 110 can accommodate the lens 130 therein. The barrel portion 110 may include a hole 112. A lens 130 may be disposed in the hole 112 of the barrel portion 110. The inner circumferential surface of the hole of the barrel portion 110 may be formed in a shape and size corresponding to the outer circumferential shape of the lens 130.

The first body 100 may include a lens 130. The lens 130 may be disposed in the barrel portion 110. The lens 130 may be coupled to barrel portion 110. The lens 130 may be disposed in the hole 112 of the barrel portion 110. The lens 130 may include a plurality of lenses 130. The lens 130 may be aligned with the image sensor 310, which will be described later. The optical axis may be aligned with the image sensor 310 of the lens 130. The optical axis of the lens 130 may coincide with the optical axis of the image sensor 310. The first body 100 may include an infrared ray filter (IR filter) being disposed between the lens 130 and the image sensor 310.

The camera module 10 may include a second body 200. The second body 200 may be referred to as one among a rear body, a lower housing, and a second housing. The second body 200 may be formed in a rectangular shape with an open upper portion. The second body 200 may be formed of a metal material. The second body 200 may be disposed below the first body 100. The second body 200 may be coupled with the first body 100. The second body 200 may form an internal space through coupling with the first body 100. The second body 200 may include a space portion 212 whose upper surface is open.

The second body 200 may include a bottom plate 202. The bottom plate 202 may face the upper plate 124 of the body portion 120 of the first body 100. The bottom plate 202 may be spaced apart from the upper plate 124 of the body portion 120 of the first body 110 in an optical axis direction. The bottom plate 202 may be parallel to the upper plate 124 of the body portion 110 of the first body 100. The bottom plate 202 may be formed in a rectangular shape. At this time, the corners of the bottom plate 202 may have a round shape at least in part.

The second body 200 may include a second side plate 206. The second side plate 206 may be extended upward from the bottom plate 202. The second side plate 206 may be extended from the outer edge of the bottom plate 202. A shield can (not shown) may be disposed on the second side plate 206. A shield can may be in surface contact with an inner surface of the second side plate 206. The upper end of the second side plate 206 may be coupled to the first body 100. The outer side surface of the second side plate 206 may be disposed inside the outer side surface of the side plate 122 of the first body 100 based on a direction perpendicular to the optical axis direction. However, this is not limited, and the outer side surface of the second side plate 206 may be disposed to form the same plane as the outer side surface of the first side plate 122.

The second body 200 may include a connector lead-out portion 290. The connector lead-out portion 290 may be coupled to the bottom plate 202. The connector lead-out portion 290 may be disposed in the hole 207 of the bottom plate 202. The connector lead-out portion 290 may penetrate the hole 207 of the bottom plate 202. The connector lead-out portion 290 may have a connector 500 disposed therein. The connector lead-out portion 290 may be formed of a metal material.

The second body 200 may include a second edge area. The second edge area may be disposed outside the space portion 212. The second edge area may be formed on an upper surface of the second side plate 206. The second edge area may form the upper edge of the second body 200. The second edge area may be disposed to face the first edge area in an optical axis direction.

When the first body 100 and the second body 200 are coupled, at least a portion of the first edge area and the second edge area may be disposed to be spaced apart in an optical axis direction. When the first body 100 and the second body 200 are coupled, an adhesive member accommodating portion that accommodates an adhesive member 600, which will be described later, may be disposed between the first edge area and the second edge area.

The second edge area may include a second protrusion 240 and a second coupling groove 250. A second coupling groove 250 may be disposed at an outside of the second protrusion 240. With respect to the optical axis direction, the first protrusion 140 and the second coupling groove 250 may be disposed to face each other, and the first coupling groove 150 may be disposed to face the second protrusion 240.

The second protrusion 240 may be formed to be protruded upward from the upper surface of the second body 200. The second protrusion 240 may be formed to be protruded upward from the upper surface of the second side plate 206. At least a portion of the second protrusion 240 may be disposed inside the first coupling groove 150. With respect to the direction perpendicular to an optical axis direction, the second protrusion 240 may be disposed to be at least partially overlapped with the first protrusion 140. The upper end of the second protrusion 240 may be disposed at an upper side of the bottom surface of the second coupling groove 250. The upper end of the second protrusion 240 or the bottom surface of the second coupling groove 250 may be disposed between the upper surface and the bottom surface of the printed circuit board 300.

As illustrated in FIG. 4, the upper surface of the second protrusion 240 may be spaced apart from the bottom surface of the first coupling groove 150 in an optical axis direction, but this is not limited, and the upper surface of the second protrusion 240 may be in contact with the bottom surface of the first coupling groove 150. The second protrusion 240 may be disposed in the first coupling groove 150 formed between the first protrusion 140 and the guide 190.

The second coupling groove 250 may be disposed outside the second protrusion 240. The bottom surface of the second coupling groove 250 may be disposed lower than the upper surface of the second protrusion 240. The first protrusion 140 may be coupled to the second coupling groove 250. As illustrated in FIG. 4, the bottom surface of the second coupling groove 250 may be spaced apart from the bottom surface of the first protrusion 140 in an optical axis direction, but unlike this, the bottom surface of the second coupling groove 250 may be in contact with the bottom surface of the first protrusion 140.

The camera module 10 may include a printed circuit board 300. The printed circuit board 300 may be disposed between the first body 100 and the second body 200. The printed circuit board 300 may be disposed in a space being formed by the coupling the first body 100 and the second body 200. The printed circuit board 300 may be disposed to be overlapped with the first edge area or the second edge area in a direction perpendicular to the optical axis direction. One surface of the printed circuit board 300 may be in contact with a lower surface of the guide 190.

An image sensor 310 may be disposed on an upper surface of the printed circuit board 300. A connector 500 may be coupled to a lower surface of the printed circuit board 300. The printed circuit board 300 may be electrically connected to the connector 500.

The camera module 10 may include an adhesive member 600. The adhesive member 600 may be an area where the adhesive is cured. More specifically, the adhesive member 600 may be an area where epoxy is cured. The coupled state of the first body 100 and the second body 200 can be firmly fixed by the adhesive member 600.

The adhesive member 600 may be disposed between the first body 100 and the second body 200. The adhesive member 600 may be disposed between the first edge area and the second edge area. As described above, the adhesive member accommodating portion, which is a space being at least partially spaced apart in an optical axis direction, is disposed between the first edge region and the second edge region, and the adhesive member 600 may be disposed in the adhesive member accommodating portion.

Therefore, the adhesive member 600 is disposed between a lower surface of the first protrusion 140 and a bottom surface of the second coupling groove 250, between an upper surface of the second protrusion 240 and a bottom surface of the first coupling groove 150, and between a side surface of the printed circuit board 300 and an inner surface of the second protrusion 240, so that the first body 100 and the second body 200 can be firmly coupled.

Referring to FIGS. 5 and 6, the second protrusion 240 may include a hole 242. The hole 242 may be formed to penetrate from an inner surface of the second protrusion 240 to an outer surface. A plurality of holes 242 may be provided and disposed to be spaced apart from one another. The hole 242 may have a rectangular cross-sectional shape, but this is not limited and may have various shapes including circular and polygonal.

As previously described, an adhesive member 600, which is an area where epoxy is cured, may be disposed on an outer surface of the second protrusion 240. Therefore, when forming the hole 242 in the second protrusion 240, the epoxy injection solution before curing may also flow into the inner space of the hole 242, thereby expanding the placement area of the adhesive member 600, there is an advantage that the coupled state of the first body 100 and the second body 200 can be maintained more firmly.

As illustrated in FIG. 6, the length A from the upper end of the hole 242 to the upper surface of the second protrusion 240 in an optical axis direction may be 0.1 mm to 0.5 mm.

The length B of the hole 242 in an optical axis direction may be smaller than ½ of the length C of the second protrusion 240 in an optical axis direction. However, the length B of the hole 242 in an optical axis direction may be greater than 0.2 mm.

When the cross-sectional shape of the hole 242 is rectangular, the width of the hole 242, that is, the length D of the long side of the rectangle, may be 0.5 mm to 5.0 mm.

The gap between adjacent holes 242 may be larger than the length of the long side of the hole 242.

A pattern (not shown) may be formed using a laser on an upper surface of the second protrusion 240 or the bottom surface of the second coupling groove 250. The pattern may include an uneven shape.

Meanwhile, in the present embodiment, the hole 242 for increasing the adhesive member placement area is formed in the second protrusion 240 as an example, but this is not limited to this, and it is natural that the adhesive member placement area can be increased by forming a hole penetrating from an outer surface to an inner surface in the first protrusion 140 of the first body 100.

Figure 7:
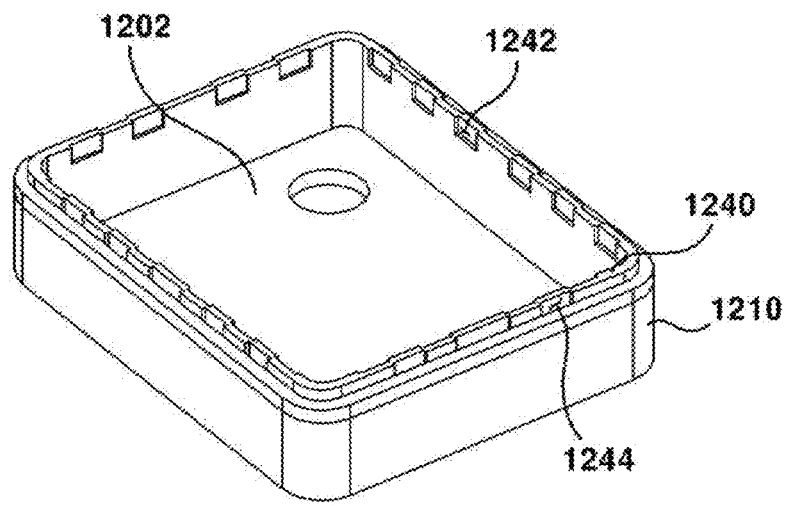
FIG. 7 is a perspective view of a second body according to a second embodiment of the present invention.
Figure 8:
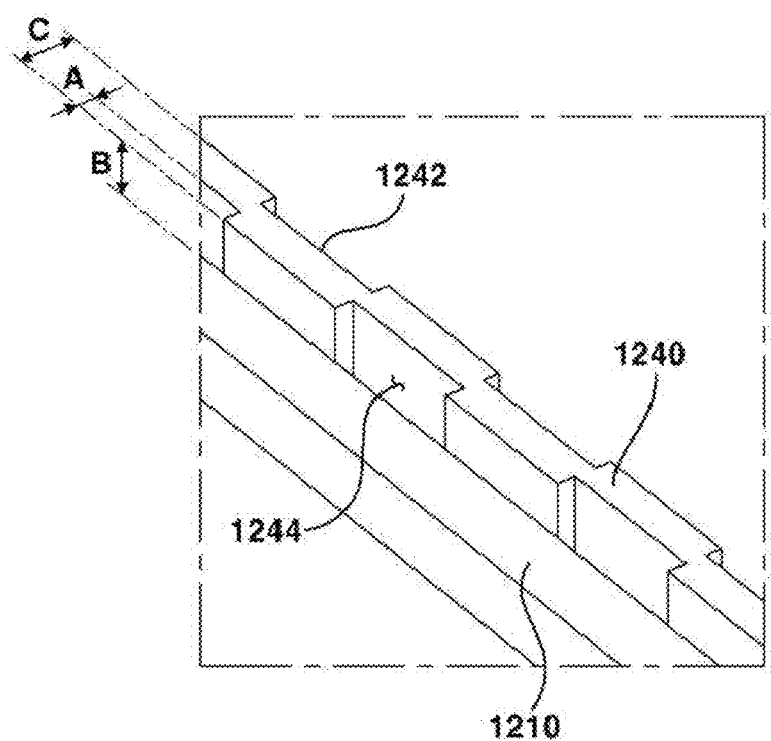
FIG. 8 is an enlarged perspective view of a second protrusion in FIG. 7.

FIG. 7 is a perspective view of a second body according to a second embodiment of the present invention; and FIG. 8 is an enlarged perspective view of a second protrusion in FIG. 7.

The present embodiment is the same as the first embodiment in other respects, but there is a difference depending on the shape of the second protrusion. Therefore, hereinafter, only the characteristic parts of the present embodiment will be described, and the description of the first embodiment will be quoted for the remaining parts.

Referring to FIGS. 7 and 8, a first groove 1242 may be disposed on an inner surface of the second protrusion 1240, and a second groove 1244 may be disposed on an outer surface of the second protrusion 1240.

The first groove 1242 may be formed to be recessed more outwardly than other areas on an inner surface of the second protrusion 1240. The second groove 1244 may be formed to be recessed more inwardly than other areas on an outer surface of the second protrusion 1240. The first groove 1242 and the second groove 1244 may each be provided in plural numbers and disposed to be spaced apart from one another. The first groove 1242 and the second groove 1244 may be disposed alternately along the circumference of the second protrusion 1240. Accordingly, the first groove 1242 and the second groove 1244 may be disposed not to face each other with respect to a direction perpendicular to the optical axis direction.

Each of the first groove 1242 and the second groove 1244 may have a rectangular cross-section, but this is not limited and may have various shapes including circular and polygonal shapes.

Based on FIG. 8, the length A from the outer surface of the second protrusion 1240 to the bottom surface of the second groove 1244 may be within 30% of the thickness C of the second protrusion 1240. Likewise, the length from the inner surface of the second protrusion 1240 to the bottom surface of the first groove 1242 may be within 30% of the thickness C of the second protrusion 1240.

The length B from the upper surface of the second side plate 1210 to the upper surface of the second protrusion 1240 in an optical axis direction may be 0.1 mm to 1.0 mm.

Furthermore, a pattern (not shown) may be formed using a laser on an upper surface of the second protrusion 1240 or an upper surface of the second side plate 1210. The pattern may include an uneven shape.

According to the above structure, there is an advantage that the placement area of the adhesive member can be increased through a plurality of groove patterns on an inner surface and an outer surface of the second protrusion 1240.

Figure 9:
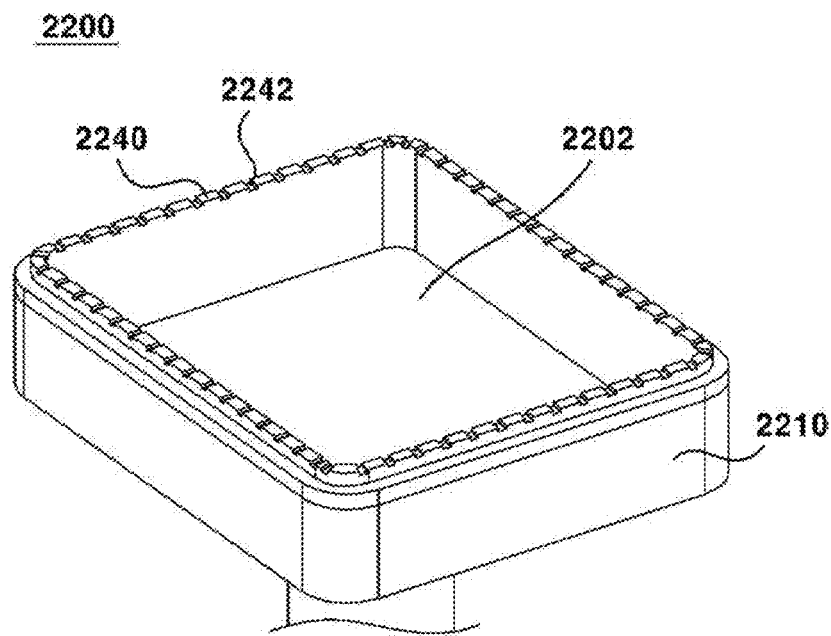
FIG. 9 is a perspective view of a second body according to a third embodiment of the present invention.
Figure 10:
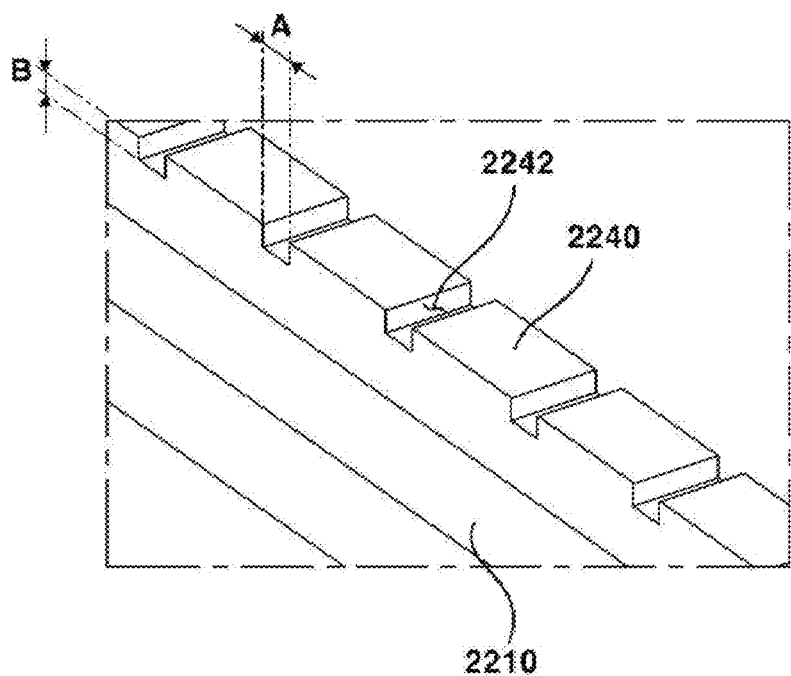
FIG. 10 is an enlarged perspective view of a second protrusion in FIG. 9.

FIG. 9 is a perspective view of a second body according to a third embodiment of the present invention; and FIG. 10 is an enlarged perspective view of a second protrusion in FIG. 9.

The present embodiment is the same as the first embodiment in other respects, but there is a difference depending on the shape of the second protrusion. Therefore, hereinafter, only the characteristic parts of the present embodiment will be described, and the description of the first embodiment will be quoted for the remaining parts.

Referring to FIGS. 9 and 10, a groove 2242 may be disposed on the upper surface of the second protrusion 2240 in a shape that is recessed lower than other areas. A plurality of grooves 2242 may be provided and disposed to be spaced apart from one another along the circumference of the second protrusion 2240.

The groove 2242 may have a rectangular cross-sectional shape.

A pattern (not shown) may be formed on an upper surface of the second protrusion 2240 using a laser. The pattern may include an uneven shape.

The width A of the groove 2242 may be 0.3 mm to 2 mm.

The length in an optical axis direction from the bottom surface of the groove 2242 to the upper surface of the second protrusion 2240 may be 0.05 mm to 1 mm.

According to the above structure, there is an advantage that the placement area of the adhesive member can be increased through a plurality of groove patterns on an upper surface of the second protrusion 2240.

Figure 11:
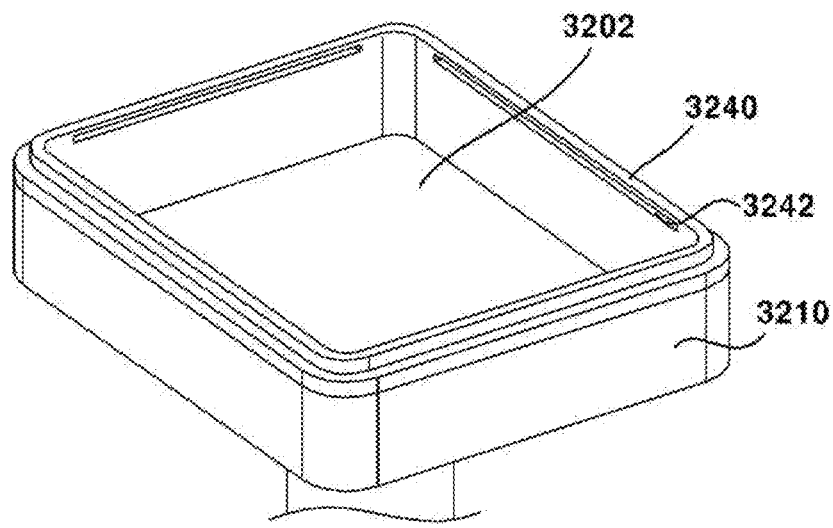
FIG. 11 is a perspective view of a second body according to a fourth embodiment of the present invention.
Figure 12:
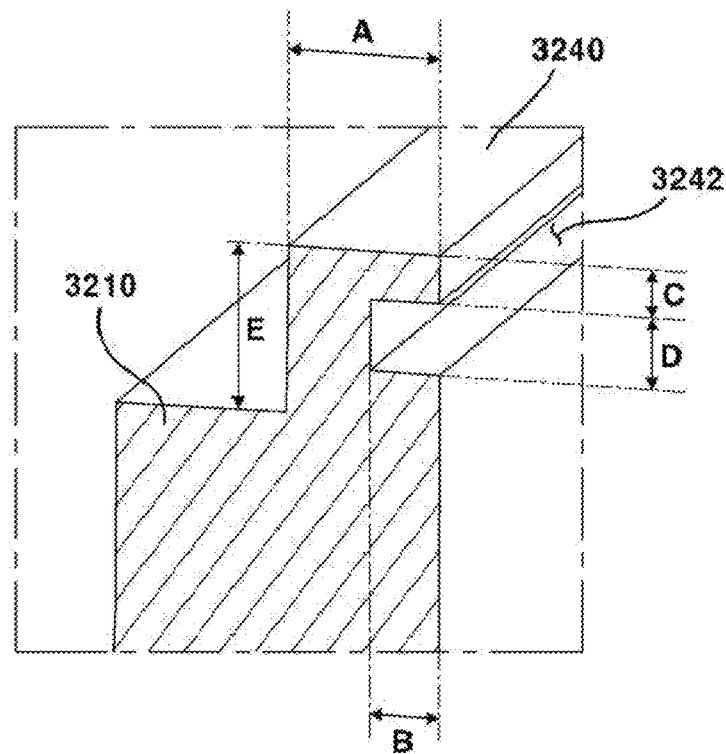
FIG. 12 is a perspective view illustrating a cut-out portion of the second protrusion in FIG. 11.

FIG. 11 is a perspective view of a second body according to a fourth embodiment of the present invention; and FIG. 12 is a perspective view illustrating a cut-out portion of the second protrusion in FIG. 11.

The present embodiment is the same as the first embodiment in other respects, but there is a difference depending on the shape of the second protrusion. Therefore, hereinafter, only the characteristic parts of the present embodiment will be described, and the description of the first embodiment will be quoted for the remaining parts.

Referring to FIGS. 11 and 12, a groove 3242 may be disposed on an inner surface of the second protrusion 3240 in a shape that is more recessed outward than other areas. A plurality of grooves 3242 may be provided and disposed to be spaced apart from one another along the circumference of the second protrusion 3240.

When the second body 3200 has a rectangular cross-sectional shape, each of the grooves 3242 may be disposed on each of the inner surfaces of the four second protrusions 3240 forming each side. The groove 3242 may be a long groove being extended in a lengthwise direction of the side.

Based on FIG. 12, with respect to a direction perpendicular to the optical axis direction, the length B from the inner surface of the second protrusion 3240 to the bottom surface of the groove 3242 may be less than ½ of the length A of the second protrusion 3240.

The length C in an optical axis direction from the upper surface of the second protrusion 3240 to the upper end of the groove 3242 in an optical axis direction may be 0.1 mm to 0.5 mm.

The length D of the groove 3242 in an optical axis direction may be less than ½ of the length E of the second protrusion 3240 in an optical axis direction, but may be 0.2 mm or more.

A pattern (not shown) may be formed on an upper surface of the second protrusion 3240 using a laser. The pattern may include an uneven shape.

According to the above structure, there is an advantage that the placement area of the adhesive member can be increased through a plurality of groove patterns on an upper surface of the second protrusion 3240.

Meanwhile, in the present embodiment, the groove 3242 is formed on an inner surface of the second protrusion 3240 as an example, but this is not limited, and the groove 3242 may be formed on an outer surface of the second protrusion 3240.

Although embodiments of the present invention have been described above with reference to the attached drawings, those skilled in the art will understand that the present invention can be implemented in other specific forms without changing the technical idea or essential features. Therefore, the embodiments described above should be understood in all respects as illustrative and not restrictive.

The invention claimed is:
1. A camera module comprising:
a first body including a lens;
a second body coupled to the first body; and
a printed circuit board disposed in a space inside the first body and the second body and including an image sensor,
wherein the first body includes a first protrusion protruded downward from a lower surface and a first coupling groove disposed inside the first protrusion,
wherein the second body includes a second protrusion protruded upward from an upper surface and facing the first coupling groove and a second coupling groove disposed outside the second protrusion and facing the first protrusion, wherein adhesive members are disposed on an inner surface, an upper surface, and an outer surface of the second protrusion, and wherein the second protrusion has at least one or more grooves or holes in which the adhesive members are at least partially disposed.

2. The camera module according to claim 1, wherein the second protrusion includes a hole penetrating from an inner surface to an outer surface.

3. The camera module according to claim 2, wherein the holes are plural, and wherein the plurality of holes are spaced apart from each other along a circumference of the second protrusion.

4. The camera module according to claim 2, wherein the length of the hole in an optical axis direction is less than ½ of the length of the second protrusion in the optical axis direction.

5. The camera module according to claim 1, wherein a first groove is disposed on an inner surface of the second protrusion, and wherein a second groove is disposed on an outer surface of the second protrusion.

6. The camera module according to claim 5, wherein a length from the outer surface of the second protrusion to a bottom surface of the second groove or a length from the inner surface of the second protrusion to a bottom surface of the first groove is within 30% of a thickness of the second protrusion.

7. The camera module according to claim 1, wherein a groove is disposed on an upper surface of the second protrusion, wherein the groove is provided in plural numbers, and the plurality of grooves are spaced apart from each another along a circumference of the second protrusion.

8. The camera module according to claim 1, wherein a groove recessed more outward than other areas is disposed on an inner surface of the second protrusion, and wherein each of the grooves is respectively disposed on an inner surface of the second protrusion forming four sides of the second body.

9. The camera module according to claim 8, wherein the groove is a long groove extended in a lengthwise direction of the side.

10. The camera module according to claim 1, wherein the adhesive member includes epoxy.

11. The camera module according to claim 2, wherein a length from a top of the hole to a top surface of the second protrusion is 0.1 mm to 0.5 mm, and wherein a width of the hole is 0.5 mm to 5.0 mm.

12. The camera module according to claim 5, wherein the first groove and the second groove are each plural, and wherein the first groove and the second groove are arranged alternately along the circumference of the second protrusion.

13. The camera module according to claim 7, wherein a width of the groove is 0.3 mm to 2 mm, and wherein a length in an optical axis direction from a bottom of the groove to a top of the second protrusion is 0.05 mm to 1 mm.

14. The camera module according to claim 8, wherein a length from an inner surface of the second protrusion to a bottom surface of the groove is less than ½ of a length of the second protrusion.

15. The camera module according to claim 8, wherein a length in an optical axis direction from a top surface of the second protrusion to a top of the groove is 0.1 mm to 0.5 mm, and wherein a length of the groove in the optical axis direction is smaller than ½ of a length of the second protrusion in the optical axis direction.

16. A camera module comprising:
a first body including a lens;
a second body coupled to the first body; and
a printed circuit board disposed in a space inside the first body and the second body and including an image sensor, wherein the first body includes a first protrusion and a first coupling groove disposed inside the first protrusion, wherein the second body includes a second protrusion facing the first coupling groove, and a second coupling groove facing the first protrusion, and wherein the second protrusion includes a groove or hole where a adhesive member is disposed.

17. The camera module according to claim 16, wherein a first groove is disposed on an inner surface of the second protrusion, and wherein a second groove is disposed on an outer surface of the second protrusion.

18. The camera module according to claim 17, wherein the first groove and the second groove are each plural, and wherein the first groove and the second groove are arranged alternately along the circumference of the second protrusion.

19. The camera module according to claim 16, wherein a groove is disposed on an upper surface of the second protrusion, wherein the groove is provided in plural numbers, and the plurality of grooves are spaced apart from each another along a circumference of the second protrusion.

20. The camera module according to claim 16, wherein a groove recessed more outward than other areas is disposed on an inner surface of the second protrusion, and wherein each of the grooves is respectively disposed on an inner surface of the second protrusion forming four sides of the second body.

* * * * *